United States Patent Office

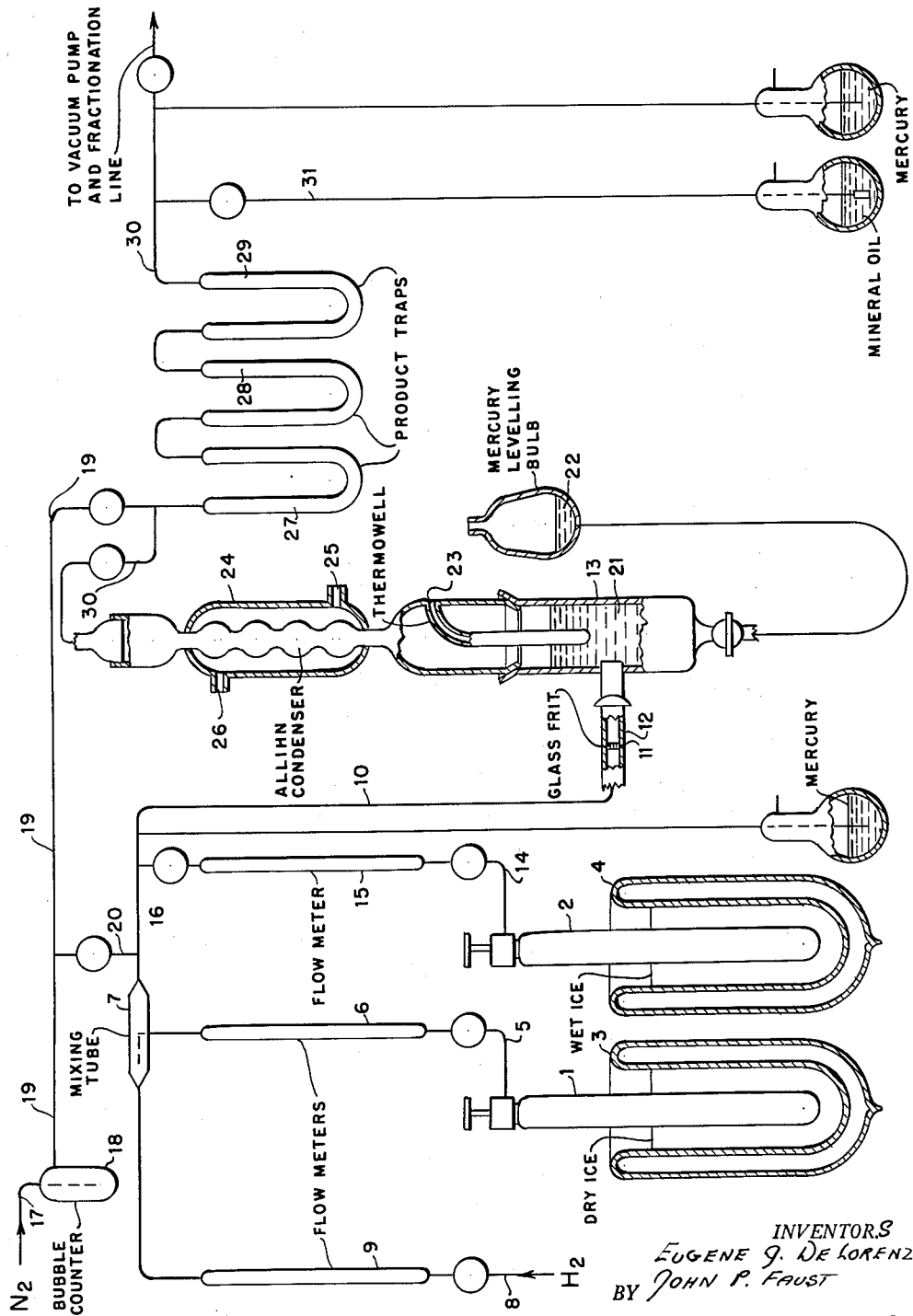

2,977,389
Patented Mar. 28, 1961

2,977,389

PREPARATION OF LIQUID REACTION PRODUCTS OF DIBORANE AND DIOLEFIN HYDROCARBONS

Eugene J. De Lorenzo, Niagara Falls, and John P. Faust, Kenmore, N.Y., assignors, by mesne assignments, to Olin Mathieson Chemical Corporation, a corporation of Virginia Filed Feb. 21, 1956, Ser. No. 566,753

4 Claims. (Cl. 260—606.5)

This invention relates to a method for the production of liquid borohydrocarbons by reacting diborane and a diolefin hydrocarbon having from 3 to 5 carbon atoms. The liquid borohydrocarbons produced are useful as fuels when burned with air as described in application Serial No. 533,944, filed September 13, 1955, in the names of Earl A. Weilmuenster and Joel A. Zaslowsky.

The production of liquid borohydrocarbons has been previously proposed by the reaction of diborane and unsaturated hydrocarbons in the gaseous phase and in admixture with an inert diluent gas at temperatures elevated by indirect heat exchange. When such reactions are carried out, however, it has been found that in addition to the liquid borohydrocarbons produced a considerable amount of solids are formed, and that these solids tend to clog the product recovery lines and condensers. It has now been found that high yields of desirable liquid products and an appreciable reduction in the formation of solids can be achieved in the reaction of diborane and unsaturated hydrocarbons in admixture with a diluent gas by passing the gaseous mixture into and through a mass of molten metal maintained within the reaction temperature range.

Thus according to the method of this invention gaseous diborane together with a gaseous diolefin hydrocarbon having from 3 to 5 carbon atoms and a diluent gas is passed into a mass of molten metal maintained at a temperature within the range of about 100° C. to 250° C. The diolefin hydrocarbons employed in the process of this invention include, for example, allene, butadiene, pentadiene and isoprene.

The term molten metals includes mercury and Wood's metal and low melting metals such as tin together with various low melting alloys, especially those containing appreciable proportions of tin, for example, solders. The metal or alloy, however, must be unreactive with the diborane, the diluent gas, and the diolefin hydrocarbon. Mercury is particularly preferred as the molten metal.

Diluent gases useful in this invention are hydrogen, nitrogen, and argon, or mixtures thereof.

The relative amounts of diborane and diolefin hydrocarbons used in the process of this invention can be varied widely. In general, however, the molar ratio of diborane to diolefin hydrocarbon will be within the range from 0.5:1 to 10:1. In the case of the lower diborane to diolefin hydrocarbon ratios, however, the liquid products produced are not has high in heat of combustion as those produced when mixtures relatively rich in diborane are employed.

The amounts of diluent gas introduced into the reaction zone can also be varied widely, the amount so introduced in practice being dependent upon the amount of diluent required to effect efficient mixing and heat transfer necessary for any particular mode of operation. In general, the gases entering the reaction system (diborane, diolefin hydrocarbon and diluent gas) will be composed of from about 20 to 90 percent by volume of diluent gas.

The process of the invention is illustrated in the following examples. The reaction system employed in carrying out the procedure of Examples I and II is shown in the accompanying drawing.

In the drawing numerals 1 and 2 represent sources such as cylinders of diborane and diolefin hydrocarbon respectively. The diborane cylinder is immersed in Dry-Ice bath 3 and the diolefin hydrocarbon cylinder is placed in water-ice bath 4. Cylinder 1 is connected by means of valved line 5 and flowmeter 6 to mixing tube 7. Dry, oxygen-free hydrogen from a source not shown is introduced through valved line 8 and flowmeter 9 into mixing tube 7. Mixing tube 7 is connected by means of line 10 passing through glass frit 11 in inlet tube 12 to reactor 13. Cylinder 2 is connected to line 10 by means of valved line 14, flowmeter 15, and valved line 16. Also connected to line 10 is nitrogen source 17 passing through bubble counter 18, line 19, and valved line 20.

Reactor 13 contains a mass of mercury 21 heated by a nichrome resistance ribbon (not shown) coiled around reactor 13. The level of the mercury in reactor 13 is controlled by levelling bulb 22 and the temperature is measured by means of an iron-constantan thermocouple (not shown) inserted into thermowell 23.

Above reactor 13 is situated Allihn condenser 24 through which cold water circulates by means of lines 25 and 26. Condenser 24 is connected to product traps 27, 28 and 29 by way of valved line 30. Trap 27 is maintained at —78° C. by a Dry-Ice bath and traps 28 and 29 are maintained at —197° C. by means of liquid nitrogen-cooled baths.

Line 30 is connected to an evacuating means (not shown) and by means of line 31 to a fritted disc immersed in mineral oil. Lines 10 and 30 are connected to mercury bubble-offs in order to permit surges and prevent air entry into the evacuated system.

EXAMPLE I

Diborane and allene cylinders are permitted to come to room temperature and weighed. The diborane cylinder weighs 489.07 g. and the allene cylinder 492.43 g. They are placed in Dry-Ice bath 3 and water-ice bath 4 respectively and connected to their respective flow meters 6 and 15. The entire apparatus including connecting lines to the cylinder needle valves and to the hydrogen flow meter is evacuated. The Dry-Ice and liquid nitrogen cooled baths are then placed around product traps 27, 28 and 29 in proper order. The apparatus is filled with hydrogen at atmospheric pressure from hydrogen source 8. The mercury level in reactor 13 is adjusted by means of levelling bulb 22 to a position 2" above the top of inlet tube 12. Hydrogen is admitted from hydrogen source 8 at a rate of 85 cc./min. and heating is started. With the mercury at a temperature of 166° C., diborane and allene are admitted to provide a molar feed ratio corresponding to $H_2:B_2H_6:C_3H_8$ of 5.7:1.9:1.

The diborane is intimately mixed with hydrogen in mixing tube 7 prior to being mixed with the allene. Further mixing of the reactant streams is provided by glass frit 11 situated in the inlet tube 12 to the reactor 13. This disc also acts as a flame arrestor in preventing the backward propagation of the reaction. The reactant gases bubble through the mercury and are cooled in Allihn condenser 24 to prevent polymerization. Nonvolatile, liquid products collect on the mercury surface and the volatile products together with unreacted diborane and allene are condensed in traps 27, 28 and 29. Most of the allene-diborane product condenses in the —78° C. trap with a small amount collecting in the first —197° C. trap. Most of the unreacted diborane condenses in the first —197° C. trap and the remainder in the second −197° C. trap. Non-condensable gases are vented through a fritted disc immersed in mineral oil by means of line 31.

At the completion of the run, i.e., after 42 minutes the diborane and allene flows are stopped, heating is discontinued and the system is flushed with hydrogen for approximately 15 minutes. The mercury level is lowered below the inlet tube and the entire system is evacuated. The cylinders are removed, allowed to warm up, and reweighed to obtain the weight of reactant gases used. The diborane cylinder weighs 486.88 g. indicating that 2.19 g. of diborane was used and the allene cylinder weighs 490.77 indicating that 1.66 g. of allene was used. Volatile products are transferred to the high vacuum line where they are fractionated through three traps maintained at −78° C., −130° C. and −197° C. respectively.

Any remaining products are then flushed from the apparatus by means of nitrogen from source 17 introduced by means of lines 19 and 20.

The chief product is 1.13 g. of a colorless liquid containing 34.1 percent boron which collects in the −78° C. trap along with a few entrained solids. A small amount of non-volatile liquid and solids remains on the mercury surface and on standing forms a hard paste with the mercury droplets.

The following Table I sets forth the pertinent data with respect to additional runs wherein diborane is reacted with allene.

EXAMPLE II

Diborane and butadiene cylinders are permitted to come to room temperature and weighed. The diborane cylinder weighs 487.30 g. and the butadiene cylinder 512.42 g. The procedure of Example I is followed except that the hydrogen flow rate is set at 79 cc./min. at S.T.P., the mercury is heated to 150° C. prior to the start of the run, and the diborane and butadiene flows are adjusted to provide a molar feed ratio corresponding to $H_2:C_4H_6:B_2H_6$ of 4.51:1.75:1. The reaction of butadiene with diborane proceeds smoothly to yield about 2 g. of a viscous non-volatile yellow orange liquid containing 16.3 weight percent boron which collects on the mercury surface. A small amount of a volatile product is formed which dissolves the Apiezon "T" grease in the vacuum line and has not been characterized.

The following Table II sets forth the pertinent data with respect to additional runs wherein diborane is reacted with butadiene.

Table I

| Flow Rate, $H_2$* | Molar Feed Ratio, $H_2/B_2H_6/C_3H_4$ | Mercury Height, inches | Average Temperature, degrees | Amount of Product, g. | Percent Boron in Product |
|---|---|---|---|---|---|
| 180 | 8.6/1.3/1 | 2 | 170 | 2.44 | 30.1 |
| 147 | 7.8/1.2/1 | 1 | 170 | | 33.5 |
| 130 | 6.7/0.97/1 | 1 | 176 | 2.69 | 27.9 |
| 147 | 5.0/1.0/1 | 1¼ | 175 | 1.96 | 27.3 |
| | 1.3/1 | 1¼ | 178 | 1.84 | 34.4 |

*Cc./min. at S.T.P.

Table II

| Flow Rate, $H_2$* | Molar Feed Ratio, $H_2:C_4H_6:B_2H_6$ | Mercury Height, inches | Reaction Temperature, degrees | Amount of Product, g. (approx.) | Percent Boron in Product |
|---|---|---|---|---|---|
| 78 | 2.2/1.54/1 | 2 | 148–156 | 4.0 | 17.6 |
| 120 | 4.7/1.79/1 | 2 | 149–166 | 2.0 | 16.4 |

*Cc./min. at S.T.P.

We claim:
1. A method for the production of liquid reaction products of diborane and a diolefin hydrocarbon which comprises passing gaseous diborane, a gaseous diolefin hydrocarbon having from 3 to 5 carbon atoms, and an inert diluent gas into a mass of a molten metal inert with respect to the reactant gases maintained at a temperature within the range from about 100° C. to 250° C. and recovering liquid organoboron products from the gaseous effluent.

2. The method of claim 1 in which the molten metal is mercury.

3. The method of claim 2 in which the diolefin hydrocarbon is allene.

4. The method of claim 2 in which the diolefin hydrocarbon is butadiene.

References Cited in the file of this patent

Gregory: Uses and Applications of Chemicals and Related Materials, vol. I, Reinhold Pub. Corp., New York, 1939, page 371. (Copy in Div. 46.)

Whatley et al.: American Chemical Society Journal, vol. 76 (1954), pages 835 to 838. (Copy in Sci. Lib.)